United States Patent
Rom et al.

(10) Patent No.: US 12,233,334 B2
(45) Date of Patent: *Feb. 25, 2025

(54) METHOD AND APPARATUS FOR PRESENTING GAMER PERFORMANCE AT A SOCIAL NETWORK

(71) Applicant: STEELSERIES ApS, Copenhagen (DK)

(72) Inventors: Kim Rom, San Francisco, CA (US); Jeffrey Nicholas Mahlmeister, Glenview, IL (US); Jacob Wolff-Petersen, Richmond (GB); Bruce Hawver, Hawthorn Woods, IL (US); Francis Arnold Grever, Palatine, IL (US); Tino Soelberg, Chicago, IL (US); Christopher John Nicolella, Elk Grove Village, IL (US)

(73) Assignee: STEELSERIES ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,295

(22) Filed: May 12, 2023

(65) Prior Publication Data
US 2023/0277924 A1    Sep. 7, 2023

Related U.S. Application Data

(63) Continuation of application No. 17/488,547, filed on Sep. 29, 2021, now Pat. No. 11,684,847, which is a
(Continued)

(51) Int. Cl.
*A63F 13/23* (2014.01)
*A63F 13/235* (2014.01)
(Continued)

(52) U.S. Cl.
CPC .......... *A63F 13/23* (2014.09); *A63F 13/235* (2014.09); *A63F 13/25* (2014.09); *A63F 13/537* (2014.09);
(Continued)

(58) Field of Classification Search
CPC ........ A63F 13/22; A63F 13/23; A63F 13/235; A63F 13/537; A63F 13/795; A63F 13/79
See application file for complete search history.

(56) References Cited

U.S. PATENT DOCUMENTS 6,641,481 B1   11/2003   Mai
7,169,051 B1   1/2007    Mossbarger
(Continued)

OTHER PUBLICATIONS

"ESL Pro Series", [http://www.esl.eu/benelux/pro-series/season5/, Apr. 26, 2012, 1 page.
(Continued)

*Primary Examiner* — Jasson H Yoo
(74) *Attorney, Agent, or Firm* — Guntin & Gust, PLC; John G. Rauch

(57) ABSTRACT

A system that incorporates teachings of the present disclosure may include, for example, receiving at a computer device a plurality of stimulus signals generated by one or more gaming accessory devices of a gamer controlling a gaming application, generating a plurality of gaming stimulations based on the plurality of stimulus signals, generating a plurality of gaming action results from the gaming application responsive to the plurality of gaming stimulations, combining the plurality of gaming action results and the plurality of gaming stimulations to generate a plurality of hardware statistics associated with the gamer, and transmitting to a social network the plurality of hardware statistics associated with the gamer.

20 Claims, 16 Drawing Sheets

Related U.S. Application Data continuation of application No. 16/518,422, filed on Jul. 22, 2019, now Pat. No. 11,161,036, which is a continuation of application No. 16/034,943, filed on Jul. 13, 2018, now Pat. No. 10,384,121, which is a continuation of application No. 15/634,855, filed on Jun. 27, 2017, now Pat. No. 10,046,237, which is a continuation of application No. 14/697,598, filed on Apr. 27, 2015, now Pat. No. 9,731,199, which is a continuation of application No. 13/456,311, filed on Apr. 26, 2012, now Pat. No. 9,044,683.

(51) Int. Cl.
*A63F 13/25* (2014.01)
*A63F 13/537* (2014.01)
*A63F 13/61* (2014.01)
*A63F 13/35* (2014.01)
*A63F 13/795* (2014.01)

(52) U.S. Cl.
CPC .............. *A63F 13/61* (2014.09); *A63F 13/35* (2014.09); *A63F 13/795* (2014.09); *A63F 2300/1025* (2013.01); *A63F 2300/535* (2013.01); *A63F 2300/5546* (2013.01); *A63F 2300/556* (2013.01); *A63F 2300/5566* (2013.01); *A63F 2300/558* (2013.01)

(56) References Cited

U.S. PATENT DOCUMENTS

| | | | |
|---|---|---|---|
| 9,044,683 B2* | 6/2015 | Rom | A63F 13/23 |
| 9,731,199 B2 | 8/2017 | Soelberg et al. | |
| 10,046,237 B2 | 8/2018 | Rom et al. | |
| 11,161,036 B2 | 11/2021 | Rom et al. | |
| 2002/0098885 A1 | 7/2002 | Sakaguchi | |
| 2003/0023687 A1 | 1/2003 | Wolfe | |
| 2005/0192097 A1 | 9/2005 | Farnham et al. | |
| 2005/0225530 A1* | 10/2005 | Evans | A63F 13/22 345/156 |
| 2006/0003040 A1 | 2/2006 | Thayer | |
| 2006/0121990 A1 | 6/2006 | O'Kelley et al. | |
| 2006/0121991 A1 | 6/2006 | Borinik et al. | |
| 2007/0173325 A1 | 7/2007 | Okelley et al. | |
| 2007/0019821 A1 | 8/2007 | Aguilar et al. | |
| 2007/0265718 A1 | 11/2007 | Graepel et al. | |
| 2008/0004094 A1 | 1/2008 | Mueller et al. | |
| 2009/0176557 A1* | 7/2009 | Hall | A63F 13/30 463/43 |
| 2009/0197681 A1* | 8/2009 | Krishnamoorthy | G07F 17/3272 463/42 |
| 2009/0264202 A1 | 10/2009 | Chen et al. | |
| 2010/0023338 A1 | 1/2010 | Petronelli et al. | |
| 2011/0092282 A1* | 4/2011 | Gary | A63F 13/837 463/31 |
| 2011/0136568 A1 | 6/2011 | Buhr | |
| 2012/0083336 A1* | 4/2012 | Ocko | A63F 13/497 463/31 |
| 2012/0122592 A1 | 5/2012 | Stafford et al. | |
| 2012/0233564 A1* | 9/2012 | Tsuchiya | A63F 13/35 715/772 |
| 2017/0291106 A1 | 10/2017 | Rom et al. | |
| 2018/0318708 A1 | 11/2018 | Rom et al. | |
| 2019/0344164 A1 | 11/2019 | Rom et al. | |
| 2022/0016521 A1 | 1/2022 | Rom et al. | |

OTHER PUBLICATIONS

"World of Warcraft", [http://us.battle.net/wow/en/community, Apr. 26, 2012, 1 page.

Otten, Martin, "Broadcasting Virtual Games in the Internet", Jun. 2001, 11 pages.

* cited by examiner

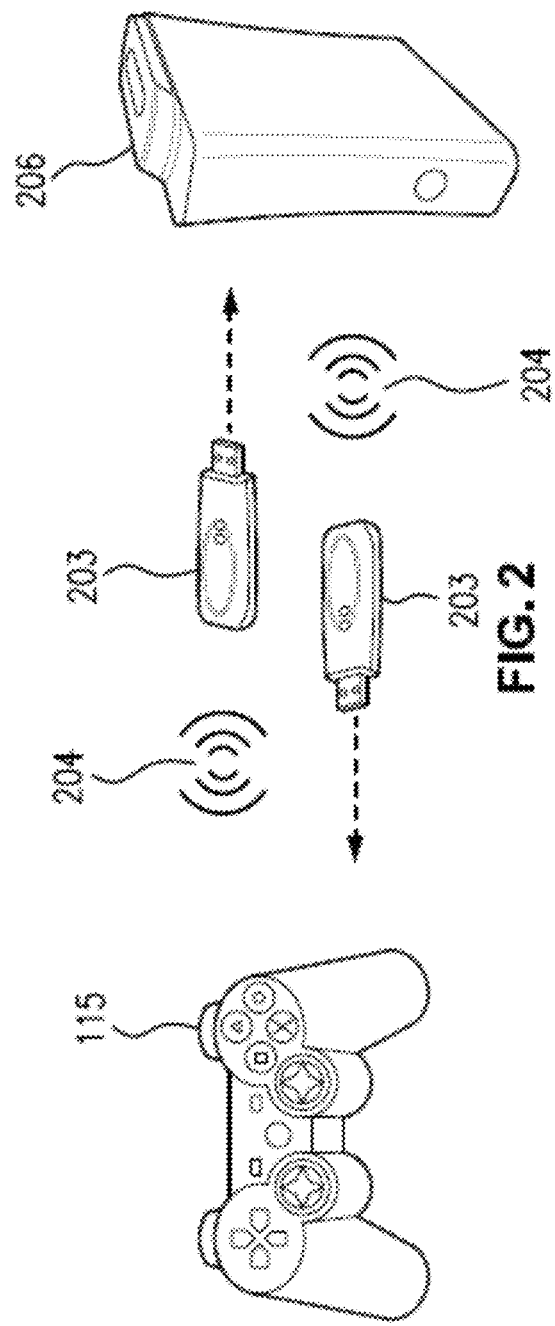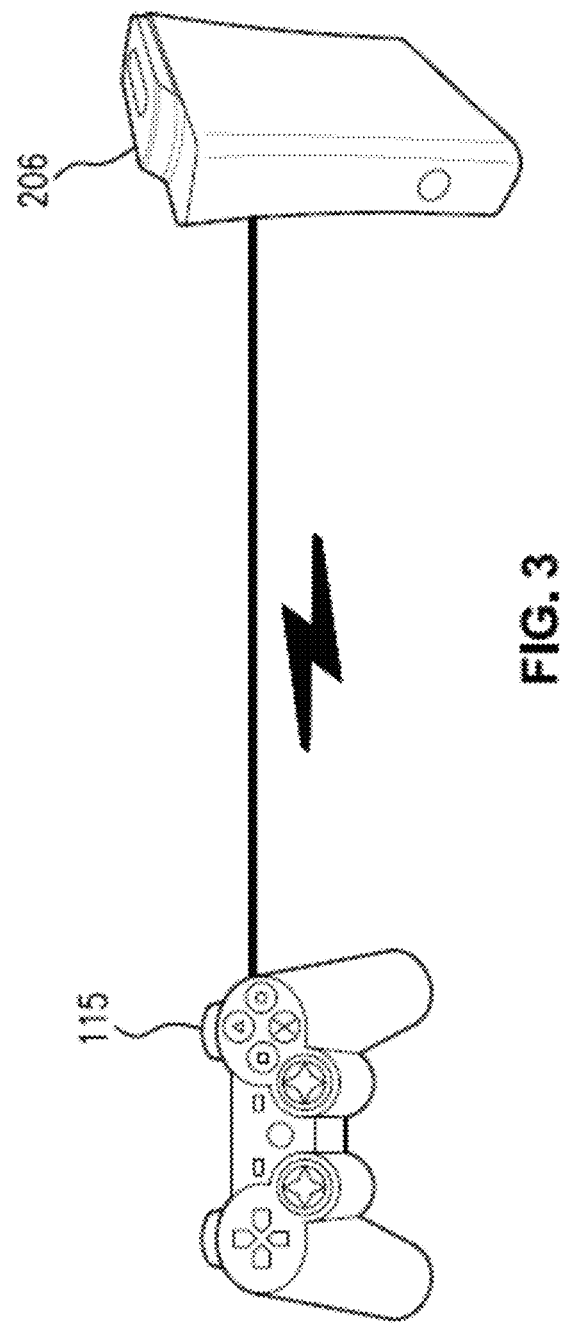

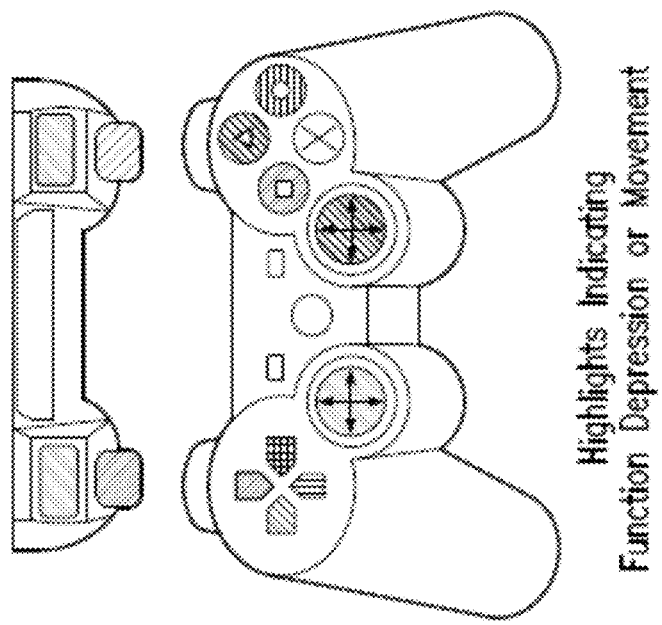
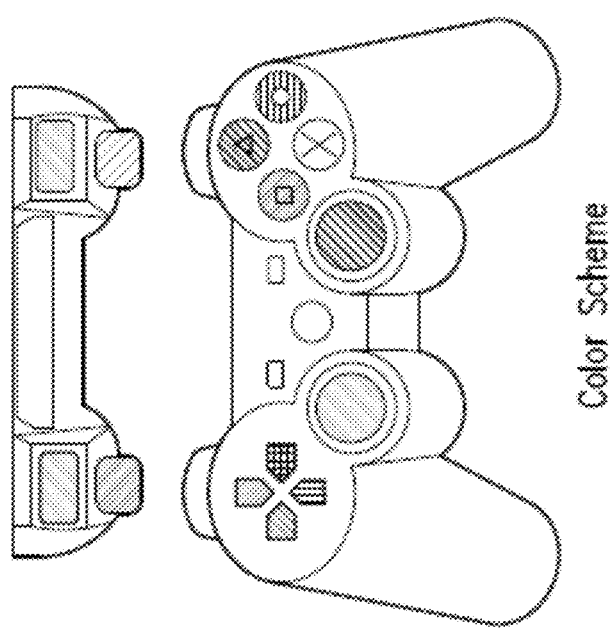
FIG. 10

Monitor II

Gamer #2

| Weapon Type | Subs Invoked | Macros Invoked | Shots | Rapid Shots | Single Shots |
|---|---|---|---|---|---|
| Sniper rifle | X/O buttons | Call for air support | 12 | 2 | 10 |
| Machine gun | — | — | 66 | 60 | 6 |
| Hand gun | Square then O buttons | Team Chat Radar | 22 | 6 | 16 |

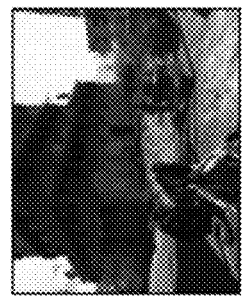
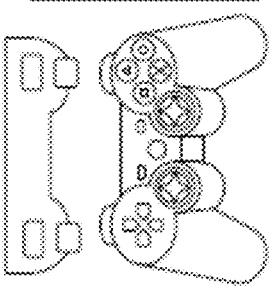

FIG. 14

Monitor I

Gamer #1

| Weapon Type | Subs Invoked | Macros Invoked | Shots | Rapid Shots | Single Shots |
|---|---|---|---|---|---|
| Sniper rifle | Up/Down | Team chat | 14 | 4 | 10 |
| Machine gun | Left 1 button | Toggle B/* Machine Gun Sniper rifle | 66 | 60 | 6 |
| Hand gun | Right 1 button | Call for air support | 10 | 6 | 4 |

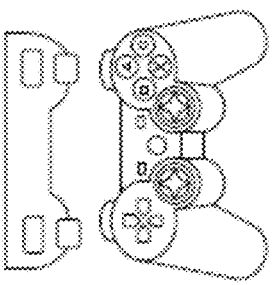

FIG. 13

Gamer Hardware Statistics

Gamer #1

| Weapon Type | Subs Invoked | Macros Invoked | Shots | Rapid Shots | Single Shots |
|---|---|---|---|---|---|
| Sniper rifle | Up/Dwn | Team chat | 14 | 4 | 10 |
| Machine gun | Left 1 button | Toggle B/w Machine Gun Sniper Rifle | 66 | 60 | 6 |
| Hand gun | Right 1 button | Call for air support | 10 | 6 | 4 |

FIG. 17

Gamer Performance Factors

Gamer #1

| Weapon Type | Misses | Non kill hits | Kill hits | Avg hit rate | Loss of life rate | Comp Rating |
|---|---|---|---|---|---|---|
| Sniper rifle | 3 | 7 | 4 | 29% | 5% | Trailing |
| Machine gun | 36 | 12 | 18 | 33% | 27% | Leading |
| Hand gun | 5 | 2 | 3 | 30% | 80% | Near even |

FIG. 18

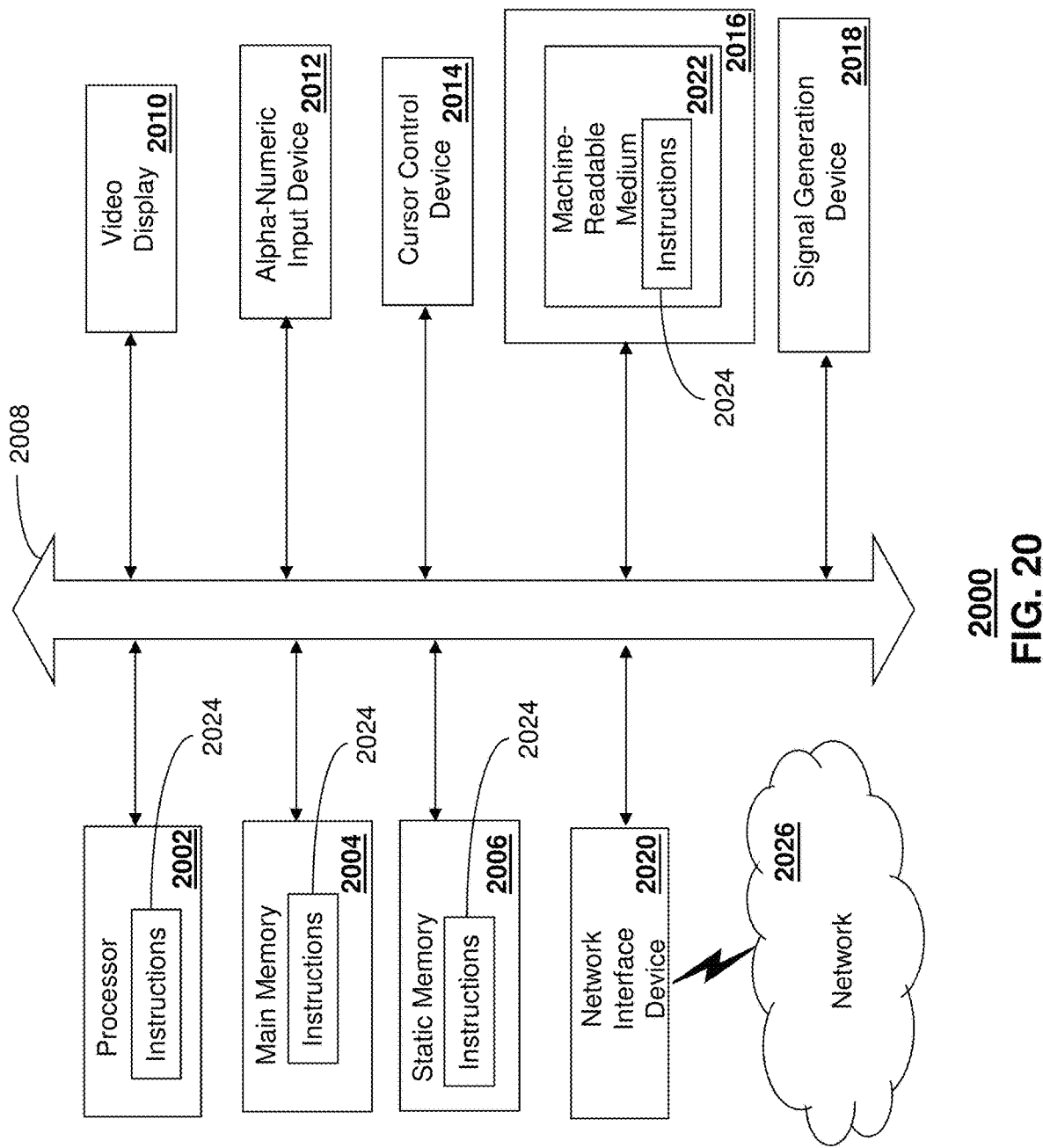

METHOD AND APPARATUS FOR PRESENTING GAMER PERFORMANCE AT A SOCIAL NETWORK

CROSS-REFERENCE TO RELATED APPLICATIONS

This application is a continuation of U.S. application Ser. No. 17/488,547, filed Sep. 29, 2021, pending, which is a continuation of U.S. application Ser. No. 16/518,422, filed Jul. 22, 2019, now U.S. Pat. No. 11,161,036, which is a continuation of U.S. application Ser. No. 16/034,943, filed Jul. 13, 2018, now U.S. Pat. No. 10,384,121, which is a continuation of U.S. application Ser. No. 15/634,855, filed Jun. 27, 2017, now U.S. Pat. No. 10,046,237, which is a continuation of U.S. application Ser. No. 14/697,598, filed Apr. 27, 2015, now U.S. Pat. No. 9,731,199, which is a continuation of U.S. application Ser. No. 13/456,311, filed Apr. 26, 2012, now U.S. Pat. No. 9,044,683. All sections of the aforementioned applications and patents are incorporated herein by reference in their entirety.

FIELD OF THE DISCLOSURE

The present disclosure relates generally to a method and apparatus for presenting gamer performance at a social network.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

Gamers frequently desire to share gaming experiences, information, and commentary with other gamers. The performance of gamers and the accessories they use during game play are a topic of interest to gamers.

BRIEF DESCRIPTION OF THE DRAWINGS

Reference will now be made to the accompanying drawings, which are not necessarily drawn to scale, and wherein:

FIGS. 2-3 depict illustrative embodiments for communicatively coupling a gaming controller to a computing device;

FIG. 10 depicts an illustrative embodiment for highlighting functions of an accessory;

FIGS. 11-14 depict illustrative embodiments for presenting performances of gamers;

FIGS. 17-18 depict illustrative examples of gamer hardware statistics and performance factors;

FIG. 20 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
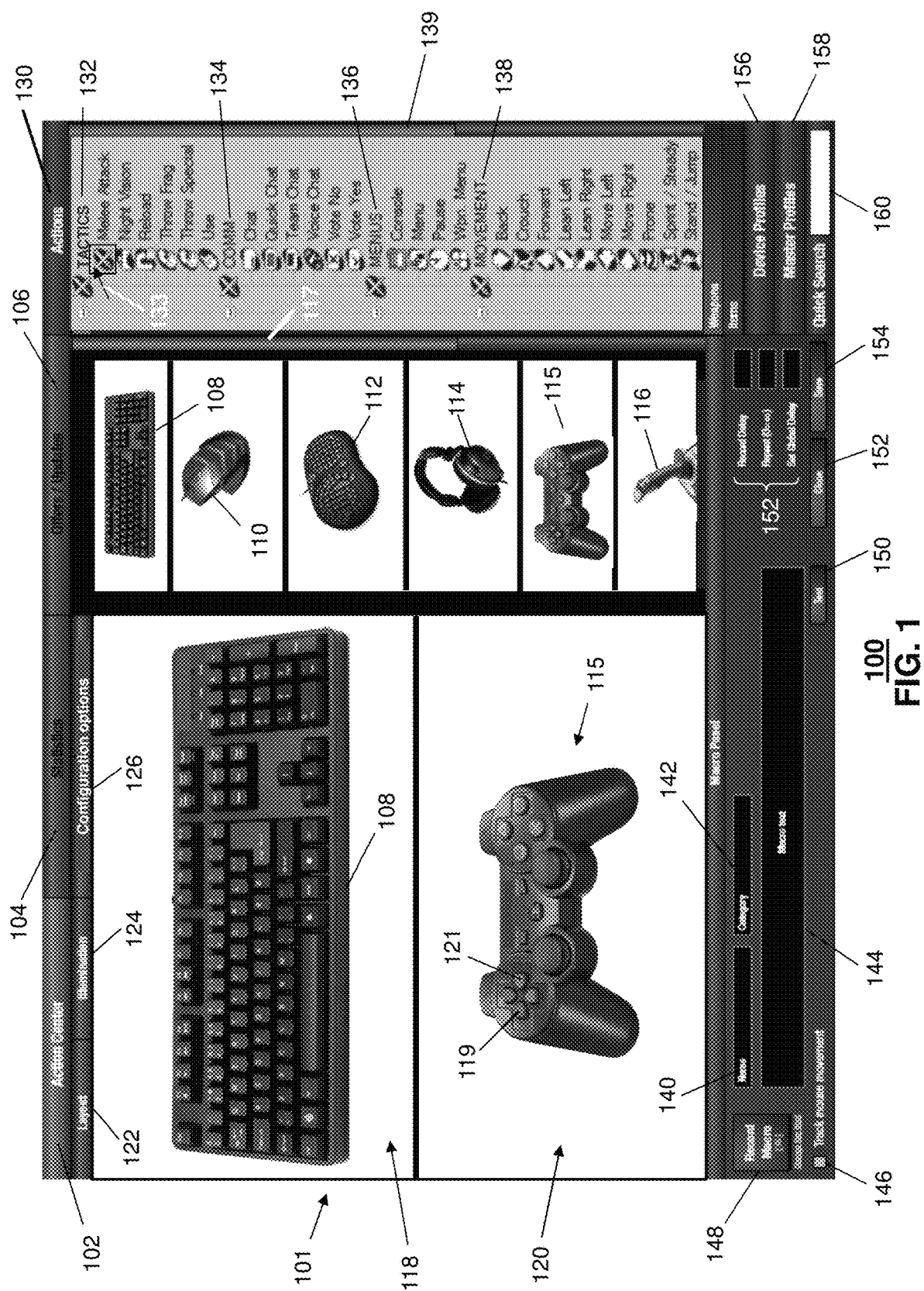
FIG. 1 depicts an illustrative embodiment of a Graphical User Interface (GUI) generated by an Accessory Management Software (AMS) application according to the present disclosure.

The subject disclosure describes, among other things, illustrative embodiments for collecting, processing, cataloguing and presenting performances of gamers and gaming accessories via a social network. Other embodiments are contemplated by the subject disclosure.

One embodiment of the present disclosure can entail a computer-readable storage medium having computer instructions, which when executed by at least one processor, cause the at least one processor to perform operations including facilitating establishment of a social network of a plurality of members, receiving a plurality of hardware statistics associated with a plurality of gamers, wherein the plurality of hardware statistics comprise a plurality of gaming stimulations generated by a plurality of gaming accessory devices of the plurality of gamers that control a gaming application and a plurality of gaming action results generated by the gaming application responsive to the gaming application processing the plurality of gaming stimulations, correlating the received plurality of gaming stimulations and the plurality of gaming action results to generate a plurality of performance factors associated with the plurality of garners, combining the plurality of hardware statistics and the plurality of performance factors to generate a plurality of hardware profiles associated with the plurality of garners, and presenting at least one hardware profile of the plurality of hardware profiles to at least a portion of the plurality of members of the social network.

One embodiment of the present disclosure can entail a device having a memory for storing computer instructions, and a processor coupled to the memory. When executing the computer instructions, the processor can perform operations including facilitating establishment of a social network of a plurality of members, receiving a plurality of hardware statistics associated with a plurality of garners, wherein the plurality of hardware statistics comprise a plurality of gaming stimulations generated by a plurality of gaming accessory devices of the plurality of garners that control a gaming application and a plurality of gaming action results generated by the gaming application responsive to the gaming application processing the plurality of gaming stimulations, and presenting at least a portion of the hardware statistics to at least a portion of the members of the social network.

One embodiment of the present disclosure can entail a method for receiving at a computer device a plurality of stimulus signals generated by one or more gaming accessory devices of a garner controlling a gaming application, generating a plurality of gaming stimulations based on the plurality of stimulus signals, generating a plurality of gaming action results from the gaming application responsive to the plurality of gaming stimulations, combining the plurality of gaming action results and the plurality of gaming stimulations to generate a plurality of hardware statistics associated with the garner, and transmitting to a social network the plurality of hardware statistics associated with the garner.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). It is contemplated that the AMS application can be executed by any device with suitable computing resources.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

In one embodiment, the gaming controller 115 can be tethered to a computer computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications therebetween. It is contemplated that the AMS application can in whole or in part be executed by computing resources of the gaming controller 115, the gaming console 206, or combinations thereof.

Figure 4:
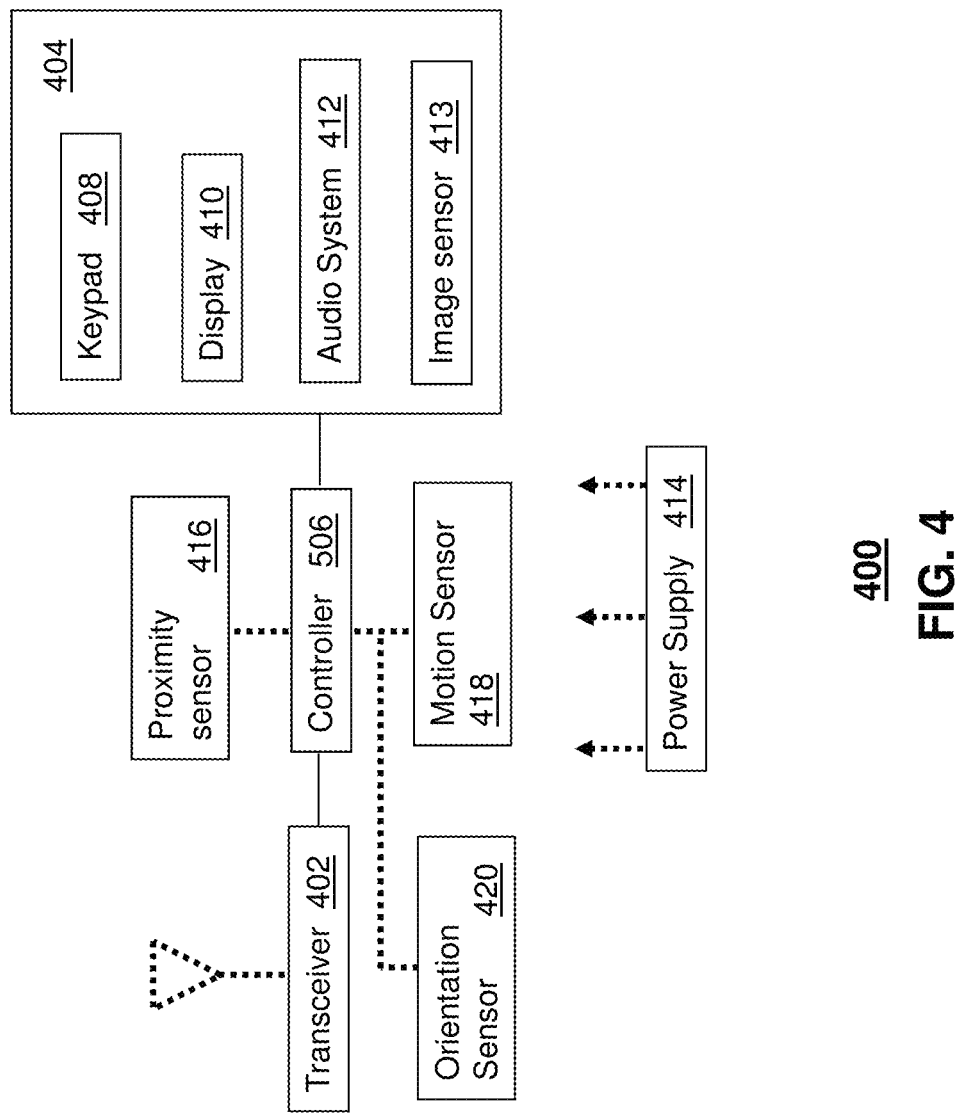
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high-volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate the implementation of the devices described by the present disclosure. These variant embodiments are contemplated by the present disclosure.

Figure 5:
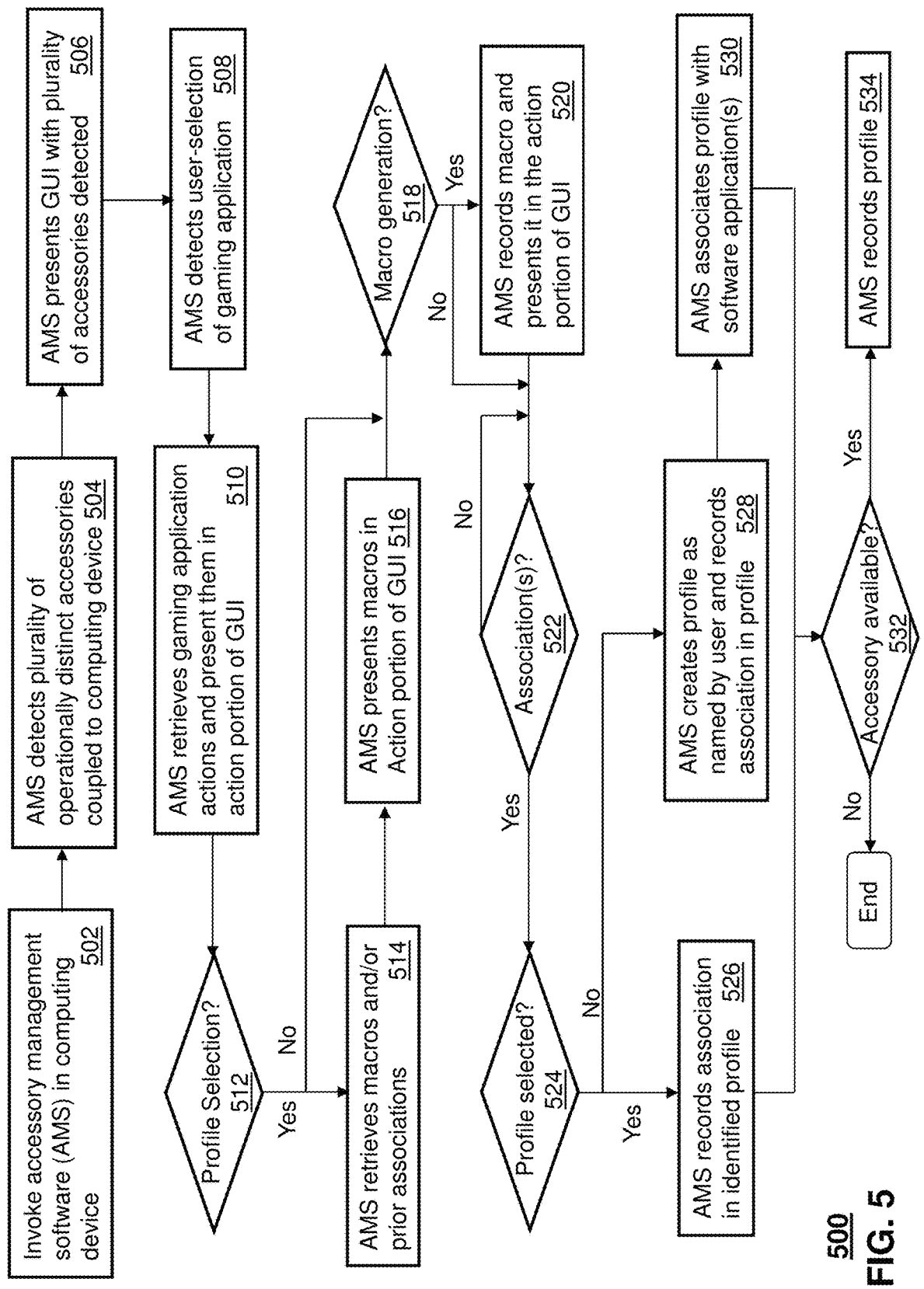
FIGS. 5-7 depict methods describing illustrative embodiments of the AMS application.
Figure 6:
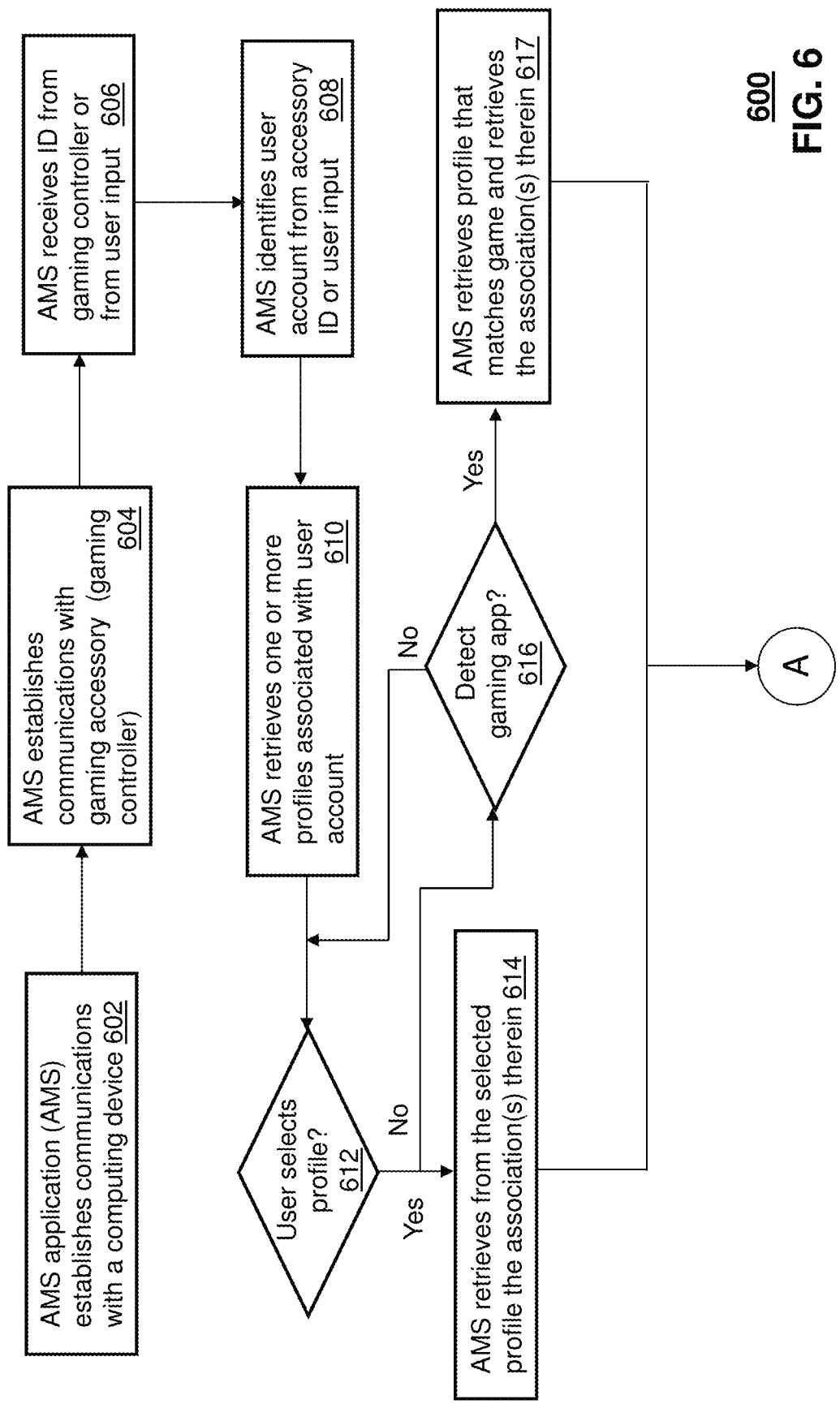
Figure 7:
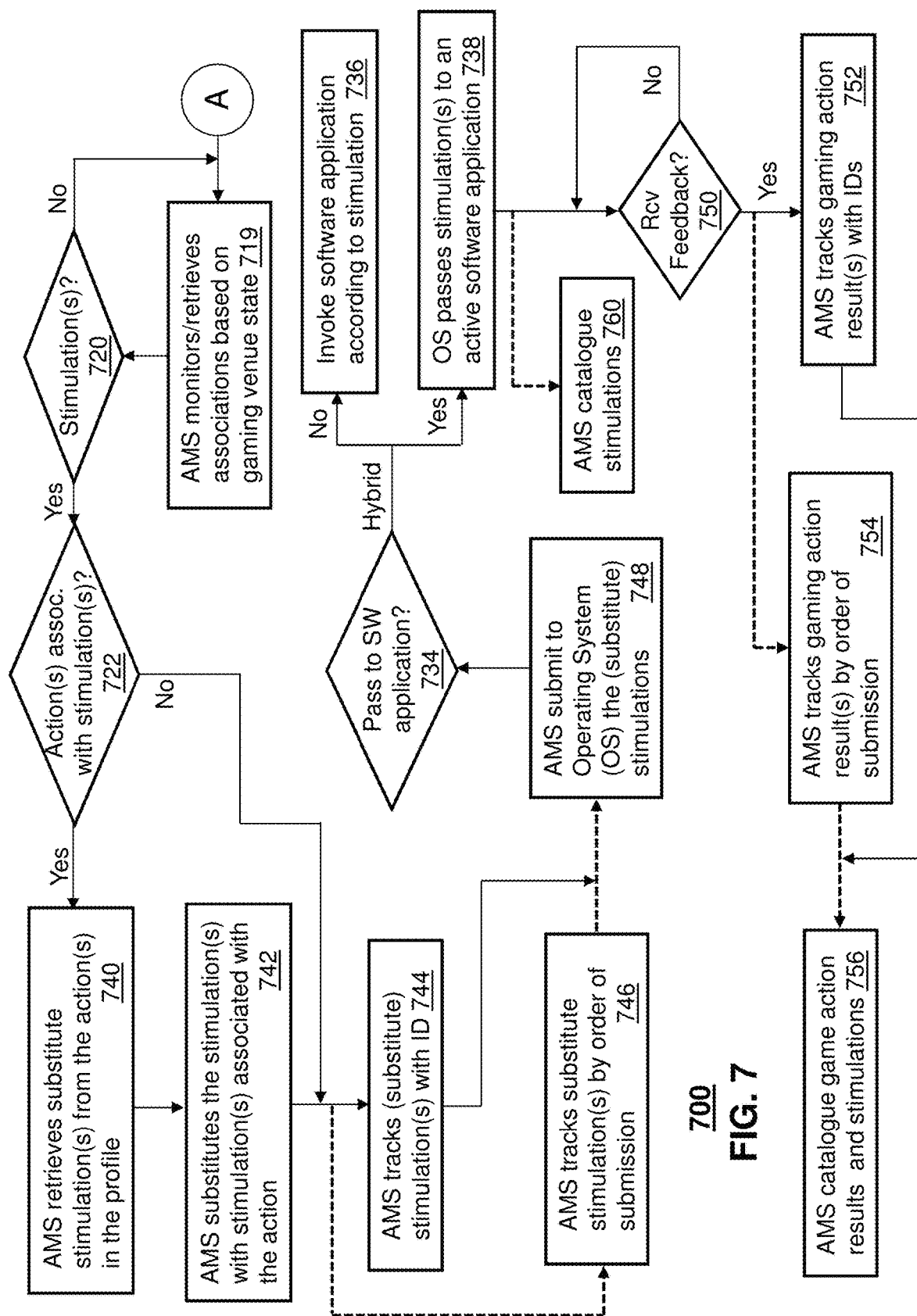

FIGS. 5-7 depict methods 500-700 describing illustrative embodiments of the AMS application. Method 500 can begin with step 502 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device), and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three-dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two- or three-dimensional movements of the gaming controller 115. If user input indicates that a user is performing an association, the AMS application can proceed to step 524 where it can determine if a profile has been identified in step 512 to record the association(s) detected. If a profile has been identified, the associations are recorded and/or stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 306) and programmable, the AMS application can proceed to step 534 of FIG. 5 where it submits the profile and its contents for storage in one of the accessories (e.g., the gaming controller 115 in FIGS. 2-3) or the dongle 203. Once the gaming controller 115, dongle 303, or combinations thereof are programmed with the profile, such devices can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the present disclosure.

FIG. 6 depicts a method 600 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three-dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three-dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again, the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state and can perform substitutions of stimuli generated by the gaming controller 115, and/or speech commands received by microphone of the headset 114.

The AMS application can monitor in step 720 stimulations generated by the accessories coupled to the gaming console 206. The stimulations can be generated by the gamer by manipulating the gaming controller 115, and/or by generating speech commands detected by the headset 114. If a simulation is detected at step 720, the AMS application can determine in step 722 whether to forward the detected stimulation(s) to an Operating System (OS) of the gaming console 206 without substitutions. This determination can be made by comparing the detected stimulation(s) to association in the profile. If the detected stimulation(s) match the associations, then the AMS application proceeds to step 740 where it retrieves substitute stimulation(s) in the profile. In step 742, the AMS application can substitute the detected stimulation(s) with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substitute stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations, the AMS application can proceed to step 748 and submit the substitute stimulations to the OS of the gaming console 206. If in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the gaming console 206 with or without tracking information as previously described.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738. For instance, suppose the stimulation sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, then the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
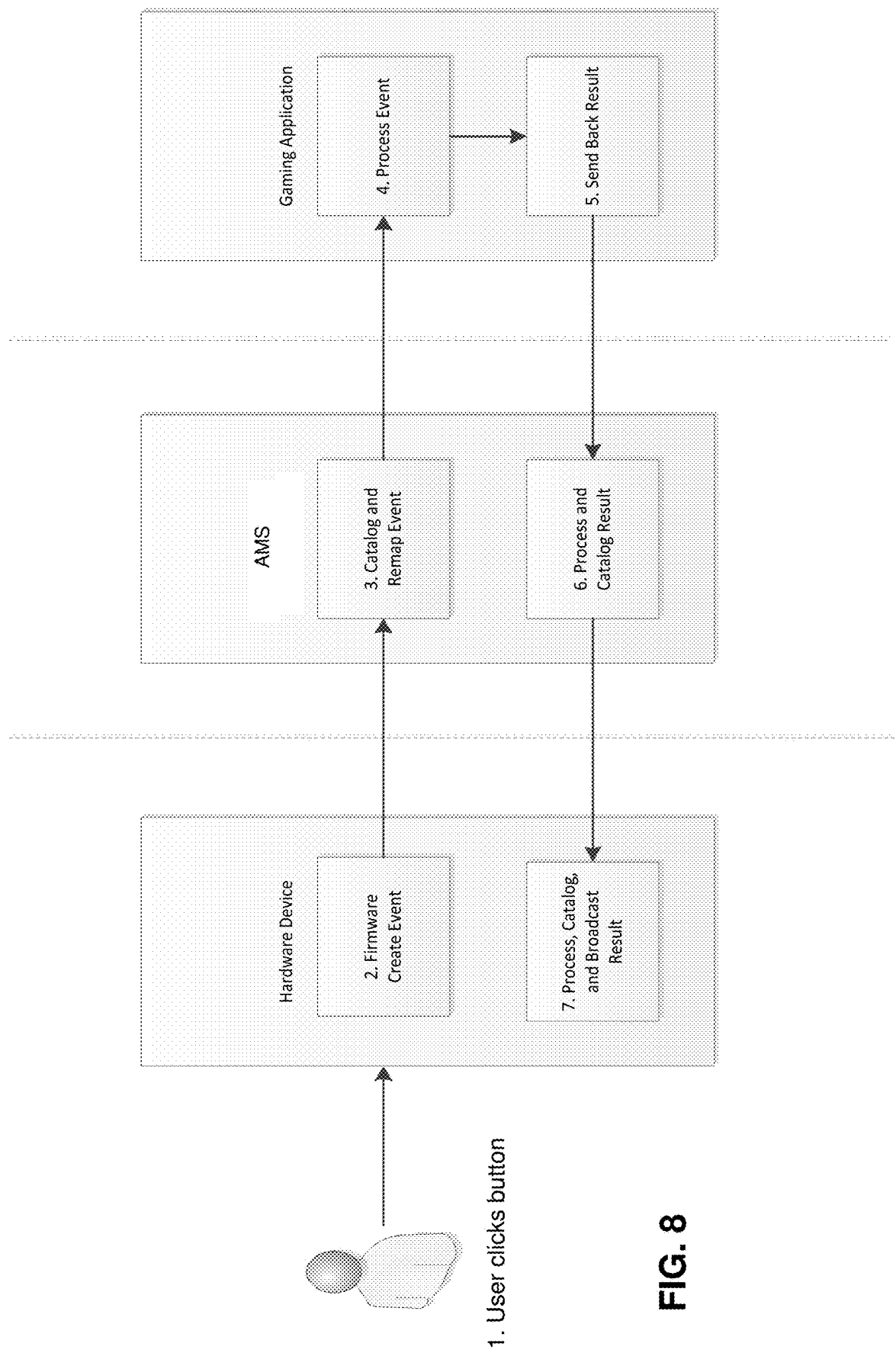
FIG. 8 depicts an illustrative embodiment of a system operating at least in part according to the methods of FIGS. 5-7.
Figure 9:
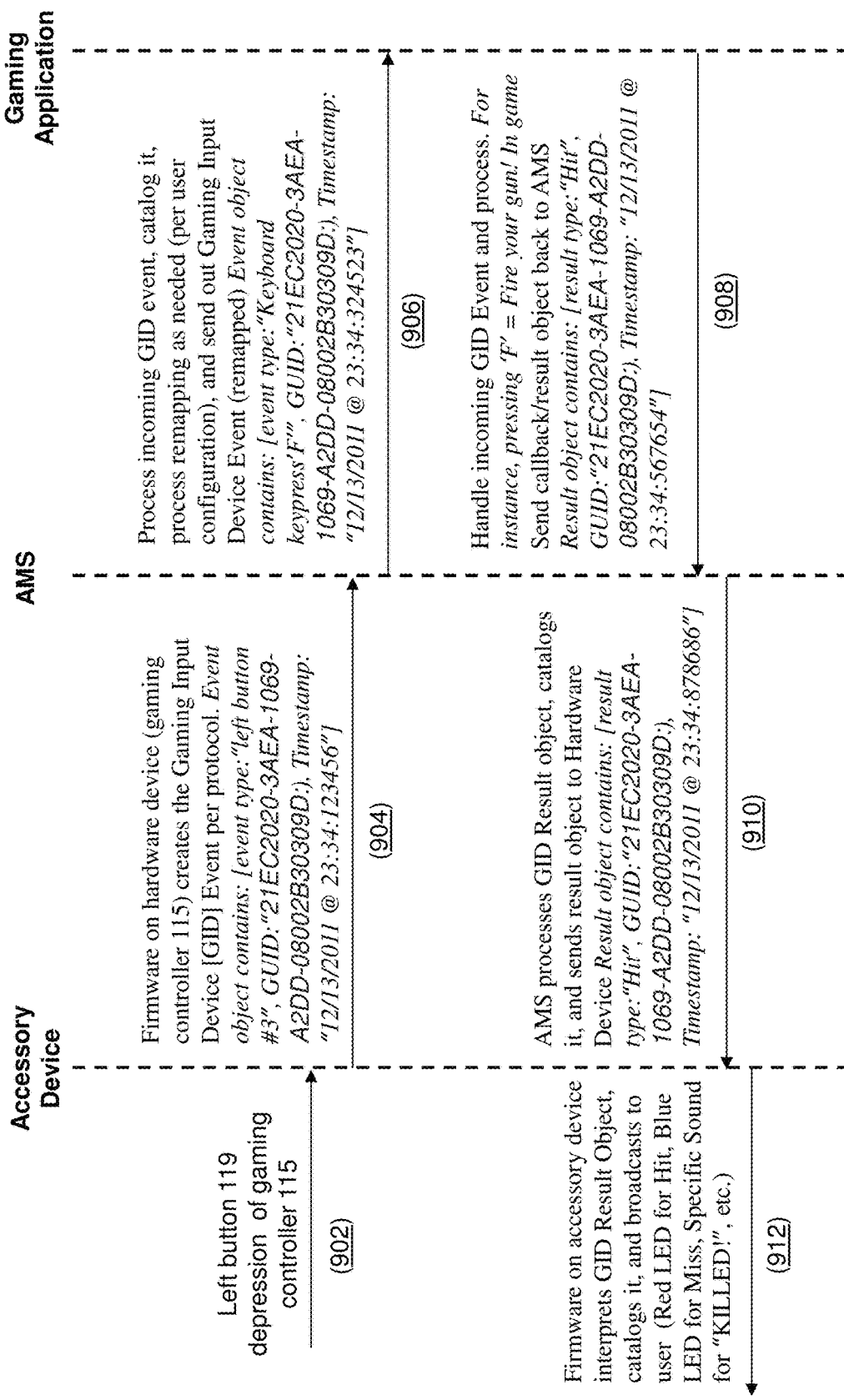
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue results as shown in FIGS. 11-14. The presentation of the catalogued results can be based on a live session, or a replay session when reviewing segments of a video game much like a replay session of a sporting event (e.g., football game) is analyzed by sports analysts. To assist the audience in viewing a competition between gamers, the AMS application can be adapted to present a virtual peripheral representative of the accessory of each gamer as shown in FIGS. 11-14.

The AMS application can be adapted to use coloring and highlight schemes to indicate when a function (e.g., a button or navigation knob) of the peripheral is being used as shown in FIG. 10. For example, the color code "dark red" can represent a button or knob that is frequently in use, while a color code of "dark blue" can represent a button or knob that is infrequently used. To indicate when a button or knob is in use, the button or knob can be highlighted with a white outline while the unused buttons can remain un-highlighted. In the case of knobs, which can be moved omni-directionally, the AMS application can show movements of a highlighted knob as the gamer is utilizing the knob based on the stimulations received by the AMS application.

For example, if a gamer moves a knob in a northwest direction, the knob is highlighted with a white outline, and the knob is shown moving in the direction chosen by the gamer. As buttons are being depressed and released rapidly, the AMS application will present rapid transitioning between the enabling and disabling of highlights to indicate the speed that the gamer is depressing and releasing the buttons. As the frequency of depressions of buttons or use of knobs increases, the AMS application will change the color code of the buttons or knobs as described above to signify frequency of use of the buttons and knobs.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Figures 11, 12:
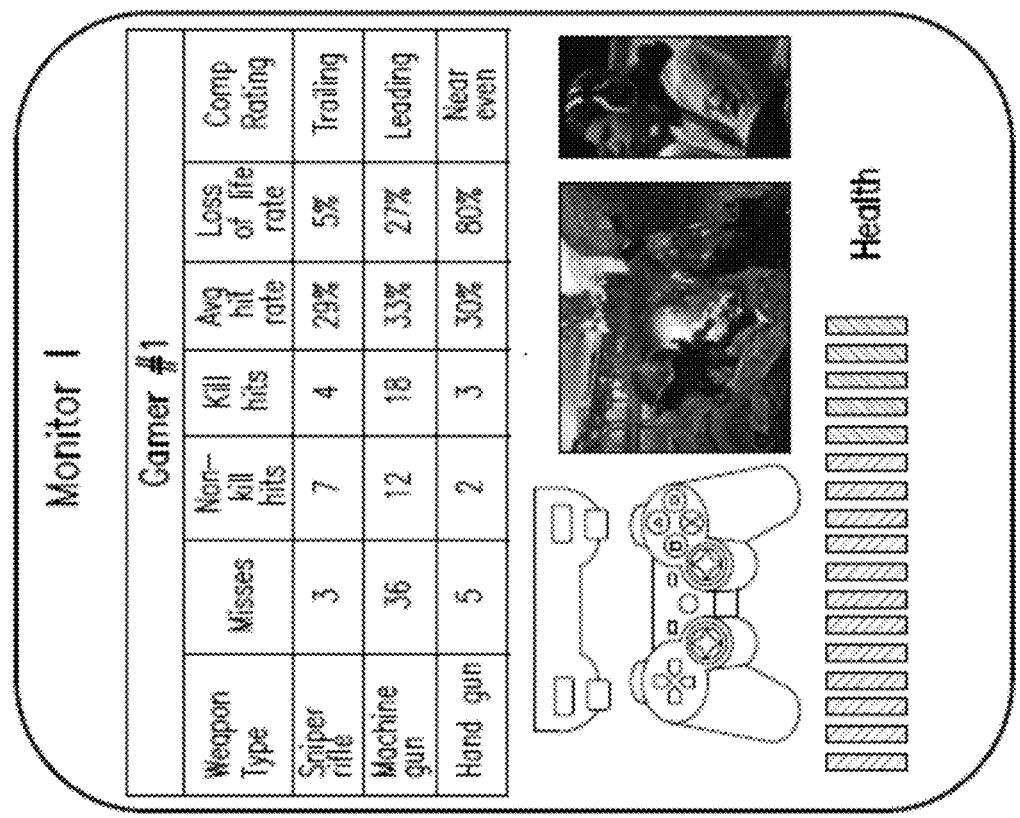

The AMS application can present performance factors of each gamer, and the type of weapons being tracked (e.g., sniper rifle, machine gun, hand gun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 11-12.

In an embodiment where the gaming application does not provide gaming action results (e.g., the video gaming application does not provide an API), the AMS application can be adapted to present a gamer's performance based on the stimulus signals generated, and where applicable, the substitute stimulus signals submitted to the gaming application as shown in FIGS. 13-14. In this illustration, the virtual peripherals are shown with the color scheme and highlights discussed earlier. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimulus generated by the AMS application to return to the sniper rifle. A depression of the right "1" button by gamer #1 resulted in substitute stimuli generated by the AMS application to call for air support. Gamer #2 shows that s/he has not invoked a substitute stimulus for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

Monitoring stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

The methods of FIGS. 5-7 can be adapted to operate in whole or in part in a gaming accessory, in an operating system of a computer, in a gaming console, in a gaming application that generates the video game, in a dongle, or any other suitable software application and/or device.

The method of FIG. 7 can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application and perform cataloguing thereof by the respective order of stimuli and gaming action results. The items can be catalogued by the AMS application with or without temporal data.

In one embodiment, the AMS application can be adapted to collect gaming action results for "all", or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiple users to control aspects of the AMS application. For example, in a tournament setting, gaming analysts having access to the AMS application can request a replay of portions of the game to demonstrate exceptional plays versus missed plays at a JumboTron™ display. The garners can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) for a macro comprising a combination of substitute stimuli and track the macro when gaming action results are received from the gaming application rather than track each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high-level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 11-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the present disclosure.

Figure 15:
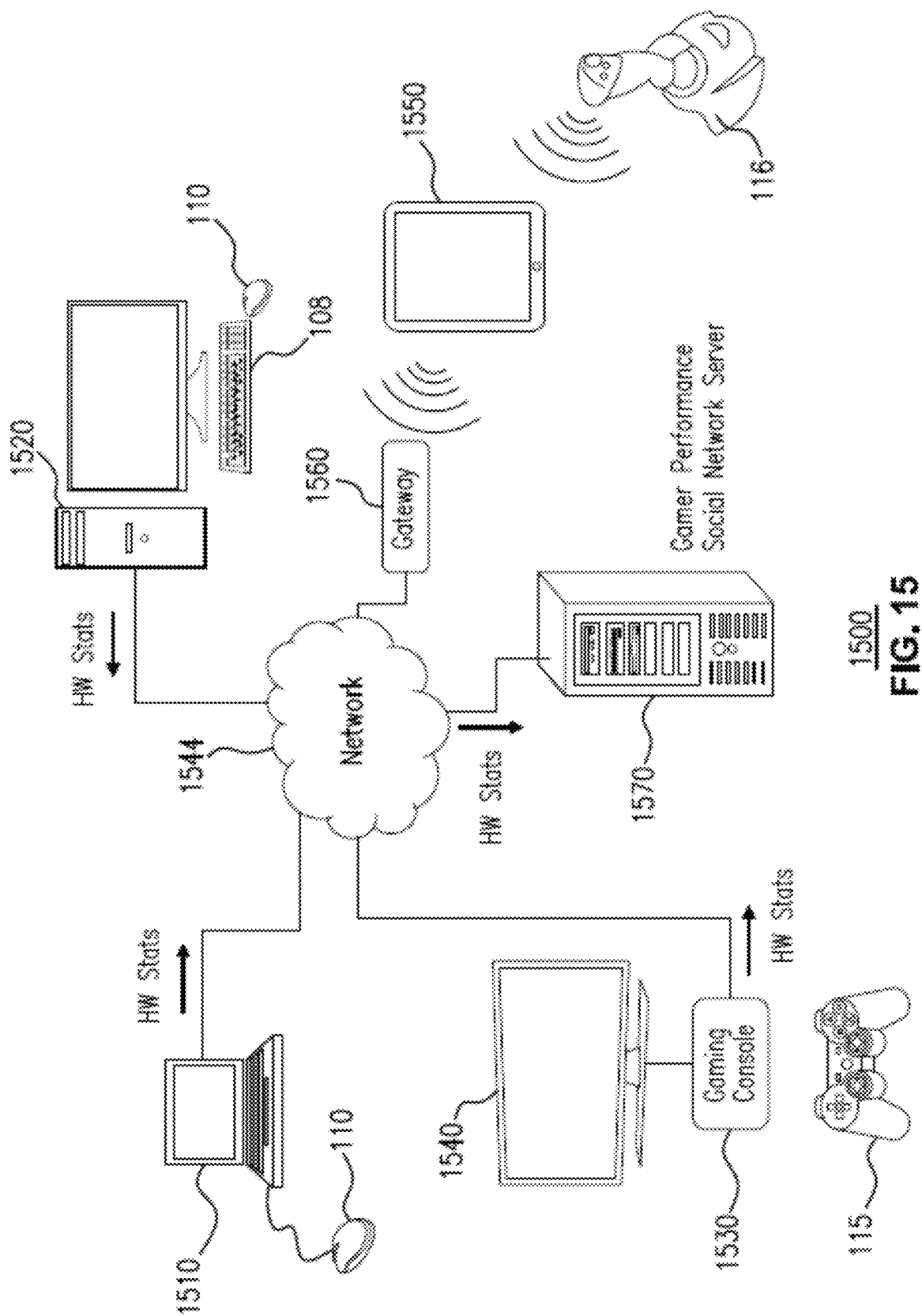
FIG. 15 depicts an illustrative embodiment of a computer system for acquiring gamer hardware information for multiple devices by way of the AMS application.

FIG. 15 depicts an illustrative embodiment of a computer system for acquiring gamer hardware information for multiple devices by way of the AMS application. System 1500 can include two or more communicatively coupled computing devices. For example, the system 1500 can include one or more computer devices 1510 and 1520, gaming console devices 1530, mobile communication devices and/or mobile computing devices 1550, and/or server devices 1570. The system 1500 can include one or more accessory devices, such as gaming console controllers 115, mouse devices 110, keyboard devices 108, and/or joystick devices 116. The system 1500 can include one or more virtual accessory devices, such as a controller device that is emulated on a mobile computer device. The several computing devices of the system 1500 can be communicatively coupled by connection to a network 1544, such as a local area network (LAN) or a wide-area network (WAN). The network 1544 can provide access to the Internet. The several computing devices of the system 1500 can be coupled to the network 1544 by wired or wireless links. The AMS application at any of the client device, such as the computer device 1510 can process received stimuli from an accessory device, such as a mouse device 110, to determine associated actions and, if necessary, perform macro-operations of multiple actions. The processed stimuli are used to navigate and control the software application running at the computer device 1510

The computer devices 1510 and 1520 can be, for example, laptop computers, desktop computers, or tablet computers. For example, a computer device 1510 of the system 1500 can process and execute computer instructions from a software application. In one embodiment, the software application can be a gaming program, where a user of the computer device 1510 can be shown a graphical user interface depicting a gaming situation on a display of, or connected to, the computer device 1510. The user of the computer device 1510 can interact with the gaming program, to provide navigational and control directives, using any one or a combination of several input devices 110. In one embodiment, the computer device 1510 can use the AMS application to monitor and capture functional inputs, or user stimulations, from physical and/or virtual accessories coupled to the computer device 1510. In one embodiment, the AMS application at the computer device 1510 can capture stimulations from a keyboard device 108 or a keyboard or touchpad built into the computer device 1510. The AMS application can process these stimulations and retrieve associated actions for use by the software application running at the computer device 1510. In another embodiment, the AMS application at the gaming console device 1530 can capture and process stimulations from a physical accessory, such as a gaming controller 115, that is coupled to the gaming console device 1530 by way of a wireless link. In one embodiment, the mobile computing device 1550 can be coupled to a joystick controller 1156 through, for example, wireless communication. A user of the client mobile computer device 1550 can navigate and control a software application at the mobile computing device 1550 using the joystick device 116.

A server device 1570 can be coupled to the network, such as an Internet-capable network. In one embodiment, the server device 1570 can host a gamer performance social network. The social network can include an Internet accessible web site that can be hosted by the server 1570 or hosted on another device, such as a web hosting service, where the server 1570 provides content. In one embodiment, the social network can support a page, group, or other special interest site at a generic social media application, such as Face-Book™, Google+™, MySpace™, or Twitter™.

The server device 1570 can receive hardware statistics from various devices 1510, 1520, 1530, and 1550 that can communicate with the server 1570 over the network. In one embodiment, the server 1570 can request hardware statistics from the devices. Alternatively, the devices can request that the server 1570 accept hardware statistics that are available for distribution. The server 1570 can have an agreement with one or more devices to collect hardware statistics as these become available. In one embodiment, devices can send hardware statistics to the server 1570, in real time, during game play. In one embodiment, devices can send hardware statistics at the end of a gaming session or on a period basis. In one embodiment, the device 1510 can perform additional post processing of the hardware statistics. For example, the device 1510 can correlate the gaming stimulations, substituted stimulations, and gaming results to generate performance factors and then send any or all of these to the server 1570. In another example, the device 1510 can further process the data to combine the hardware statistics and the performance factors into a hardware profile of the gamer for this game play and then forward the results to the server 1570. In one embodiment, the hardware statistics are reported to the server 1570 as raw gaming stimulations, macro-substituted stimulations, and gaming action results. The server 1570 can then perform the post processing analysis of the reported data to generate performance factors and/or hardware profiles.

In one embodiment, a device can send hardware statistics from other devices to the server 1570. For example, the computer device 1510 can capture hardware statistics from the mobile computing device 1550 and forward these hardware statistics to the server 1570. In one embodiment, the computer device 1510 and the mobile computing device 1550 can be engaged in playing a video game of a gaming application at the same time. For example, the computer device 1510 and the mobile computing device 1550 can play a video game over an Internet connection. AMS applications at the computer device 1510 and the mobile computing device 1550 can capture hardware statistics, including gaming stimulations generated by gaming accessories 110 and 116 and gaming action results generated by the gaming application. In one embodiment, each device 1510 and 1550 can report the hardware statistics directly to the server 1570. In another embodiment, one of the devices, such as the computer device 1510, can capture the hardware statistics for both devices and then forward the combined data to the server 1570.

In one embodiment, the server 1570 can host a video game of a gaming application. For example, devices 1540 and 1520 can participate in a video game that is hosted by the server 1570. In one embodiment, the server 1570 can execute the gaming application and the gaming devices 1540 and 1520 can log into the server to join or begin the video game. In this case, the server 1570 can acquire and retain hardware statistics for the devices 1540 and 1520 automatically as gaming stimulation data is transmitted to and processed by the server device 1570. In another embodiment, the server 1570 can arrange a game play by allowing the devices 1540 and 1520 to find one another at the server. For example, the server 1570 can advertise at a hosted site that a game of World of Warcraft™ is seeking participants. The devices 1540 and 1520 can sign up to join the scheduled game and be given an opportunity to agree to allow the server 1570 to acquire hardware statistics from the game play. The actual World of Warcraft™ gaming application can be executed on another device, such as a cloud server, free the server 1570 from this burden.

In one embodiment, the server 1570 can acquire graphical representations of game play at a device. As the gaming application executes at a device, such as the computer device 1520, computer generated graphics are presented to the gamer for context and feedback during game play. This computer generated graphics can be sent to the server 1570 during or after game play. For example, the computer device 1520 can stream the graphical representations to the server during game play so that another user of the server 1570, such as a member of the gamer performance social network, can view the gaming action in real time. In another example, the computer device 1520 can send the graphical representations of the game play to the server after game play has ended or has been suspended. In one embodiment, the computer device 1520 can send a file to the server 1570 including the graphical representations during times when the computer device 1520, the server 1570, and/or the network are most available or have greater bandwidth.

In one embodiment, user profiles can be maintained to govern the transfer of the hardware statistics to the server 1570. In one embodiment, each device 1510 maintains user profiles for the gamer, or gamers, who play using the device 1510. In one embodiment, the user profiles are maintained by the server 1570. The user profiles can control what data is reported to the server 1570 for which video game and which device. For example, one gamer can decide to participate in sending data to the gamer performance social network while another gamer at the same device 1510 can decide not to send data. For example, a gamer at a device 1510 can decide to send data to the server 1570 for one video game but not another or to send data for one accessory but not another. The gamer at the device 1510 can select whether to send the data during game play or to wait until the game is concluded or suspended. In one embodiment the user profile can control gamer preferences associated with other functions of the gamer performance social network, such as the extent to which hardware statistics, profiles, and/or performance factors are shared with other members, participation in social network credit acquisition, comments, and valuation of gamer performance.

Figure 16:
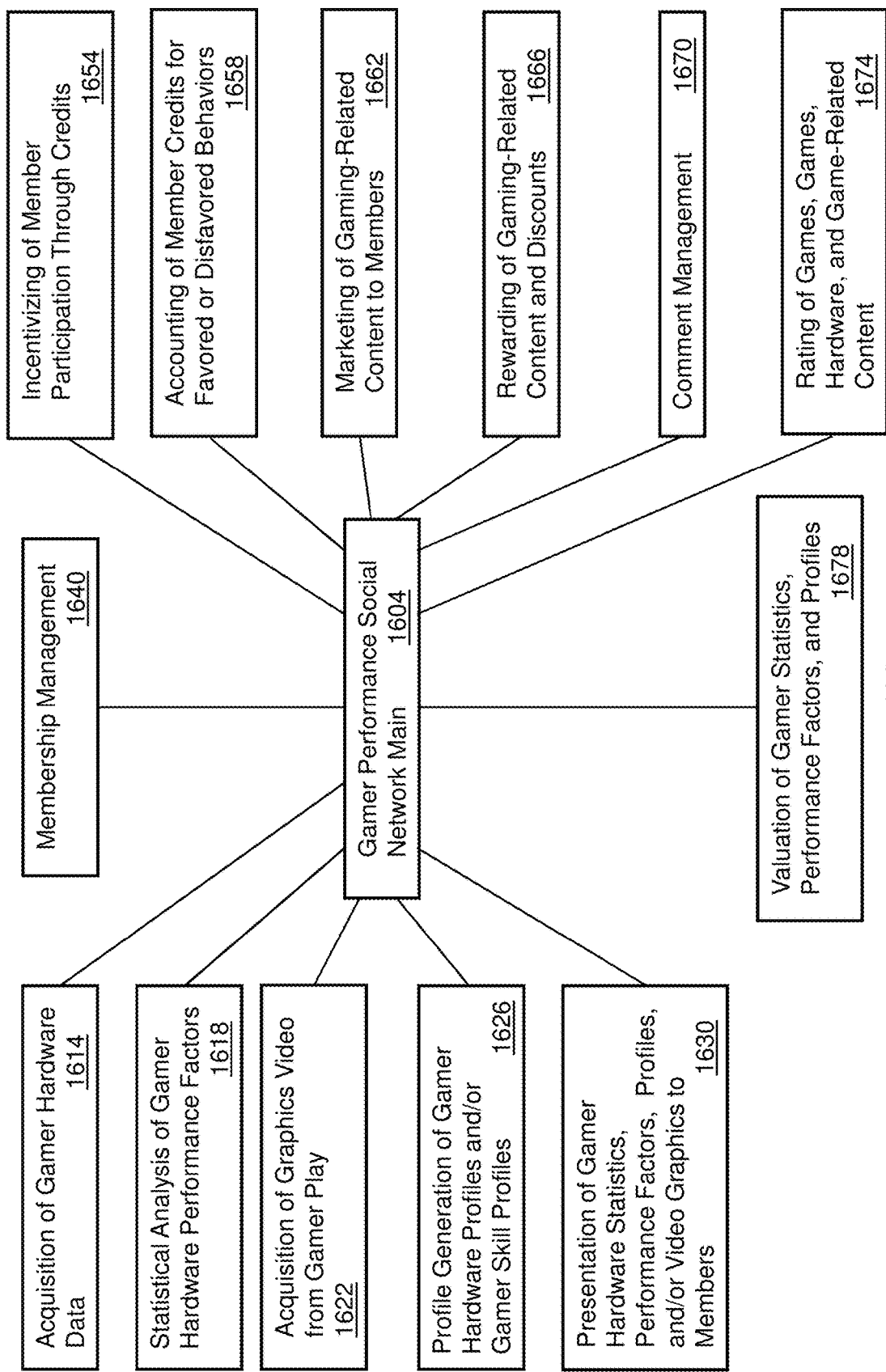
FIG. 16 depicts an illustrative embodiment of a gamer hardware statistics social network.

FIG. 16 depicts an illustrative embodiment of a gamer performance social network. Network 1600 can include two more modules that determine the features and performance of the network 1600. Features of the social network can include several modules that can exhibit varying levels of interrelationships to one another. A main module 1604 of the gamer performance social network can include an overarching module that allows the several modules to be effectively and reliably integrated. In one embodiment, the main module operates a website accessible by a URL over the Internet.

In one embodiment, the social network 1600 can include a data acquisition module 1614 for acquiring gamer hardware statistics. In one embodiment, the server 1570 can request hardware statistics from the devices. Alternatively, the devices can request that the server 1570 accept hardware statistics that are available for distribution. The server 1570 can have an agreement with one or more devices to collect hardware statistics as these become available. In one embodiment, devices can send hardware statistics to the server 1570, in real time, during game play. In one embodiment, devices can send hardware statistics at the end of a gaming session or on a period basis. In one embodiment, a device 1510 can perform additional post processing of the hardware statistics prior to sending these statistics to the server 1570. For example, the device 1510 can correlate the gaming stimulations, substituted stimulations, and gaming results to generate performance factors and then send any or all of these to the server 1570. In another example, the device 1510 can further process the data to combine the hardware statistics and the performance factors into a hardware profile of the gamer for this game play and then forward the results to the server 1570. In one embodiment, the hardware statistics are reported to the server 1570 as raw gaming stimulations, macro-substituted stimulations, and gaming action results. The server 1570 can then perform the post processing analysis of the reported data to generate performance factors and/or hardware profiles.

In one embodiment, a device can send hardware statistics from other devices to the server 1570. For example, the computer device 1510 can capture hardware statistics from the mobile computing device 1550 and forward these hardware statistics to the server 1570. In one embodiment, each device 1510 and 1550 can report the hardware statistics directly to the server 1570. In another embodiment, one of the devices, such as the computer device 1510, can capture the hardware statistics for both devices and then forward the combined data to the server 1570.

In one embodiment, the social network 1600 can include a statistics analysis module 1618 to calculate gamer hardware statistics. In one embodiment, the server 1570 can receive raw gaming simulations, macro-substituted stimulations, and gaming action results for each gamer participating in play of a video game. The server 1570 can correlate the received raw gaming simulations, macro-substituted stimulations, and gaming action results to calculate performance factors for this gamer. As an example, FIGS. 17-18 illustrates exemplary gamer hardware statistics and gamer performance factors for a gamer playing a first-person shooting game such as World of Warcraft™. The gamer hardware statistics reported to the server 1570 include information on interactions by this gamer with the gamer's computer device and accessory devices resulted in gaming action results. Referring particularly to FIG. 17, the gaming stimulations indicate that the gamer selected three different weapons during the game, a sniper rifle, a machine gun, and a handgun. While the sniper rifle was selected, the gamer triggered a substitute stimulation of Up/Down for the keyboard 108 or another accessory, invoked a team chat macro sequence, and fired fourteen shots, with four of these rapid shots and the balance single shots. Similarly for the machine gun and the hand gun, the gamer triggered substitution stimulations, macros, and performed different shot types. The hardware statistics of FIG. 17 illustrate in a chart form at least some of the actions taken by the gamer during the game play.

Referring now to FIG. 18, the raw gaming simulations, macro-substituted stimulations, and gaming action results can be further correlated to determine several performance factors for the gamer. In the correlation step, the gaming action results are aligned with the gaming stimulations and substitute stimulations to assess what happened during each of the weapon shots logged in the hardware statistics. As a result, gamer performance factors show which shots resulted in a miss, a non-kill hit, or a kill, and calculates percentages to represent the gamer's accuracy and/or effectiveness.

In one embodiment, the social network 1600 can include a video acquisition module 1622 to acquire graphical representations of the video game play. In one embodiment, the server 1570 can acquire graphical representations of game play at a device. As the gaming application executes at a device, such as the computer device 1520, computer generated graphics are presented to the gamer for context and feedback during game play. This computer generated graphics can be sent to the server 1570 during or after game play. For example, the computer device 1520 can stream the graphical representations to the server during game play so that another user of the server 1570, such as a member of the gamer performance social network, can view the gaming action in real time. In another example, the computer device 1520 can send the graphical representations of the game play to the server after game play has ended or has been suspended. In one embodiment, the computer device 1520 can send a file to the server 1570 including the graphical representations during times when the computer device 1520, the server 1570, and/or the network are most available or have greater bandwidth.

Referring again to FIG. 16, in one embodiment, the social network 1600 can include a profile module 1626 to generate gamer hardware profiles and/or gamer skill profiles. In one embodiment, the gamer hardware profile can include a combination of hardware statistics associated with the gamer and performance factors correlated for the gamer. For example, the data represented in FIGS. 17 and 18 can be combined to generate a hardware profile for the gamer. In one embodiment, the gamer hardware profile can include averages of values acquired by the social network 1600 for various time periods, including, for example, single game plays, tournament averages, league averages, and lifetime averages. In one embodiment, the gamer hardware profile can include comparative ratings against other gamers. For example, the gamer's profiled hardware statistics and performance factors can be compared to other gamers in a classification based on performance or other gamers in a league or tournament. The gamer's profiled statistics and factors can also be compared to his or her prior profiles.

In one embodiment, a gamer skill profile can be synthesized for a gamer by detecting correlations between the hardware statistics, the gaming action results, the performance factors, and graphical representations of the game play. For example, the hardware statistics and gaming action results can show that a gamer exhibits faster than average abilities to fire a machine gun and above average kill percentages. Further, when the hardware statistics are correlated to the graphical representation of the game play, this correlation can show that the gamer is highly effective when firing from good cover but is not effective in close combat situations. The gamer skill profile can label this gamer as a good defender but weak attacker based on this correlation. In other examples, the profile module 1626 can assess the gamer's abilities to accurately shoot on the run, degradation in performance when under attack by multiple opponents, to kill after a weapon switch, or to accurately shoot from distance. The profile module 1626 can further label the gamer, for example, as an attacker, as cool under fire, as a multiple weapon expert, or as a sniper. Any of the correlated skills can be compared to other gamer in a classification based on performance or in a league or tournament or to prior performance by the gamer.

In one embodiment, the social network 1600 can include a presentation module 1630 to present gamer statistical information and video graphics of game play to members of the social network 1600. In one embodiment, the social network can present hardware statistics, performance factors, and hardware profiles to members. In one embodiment, the social network 1600 can present graphical representations of game play to members of the social network. For example, the social network can present statistical information or graphical representations on a website or on a page of a generic social media site or by linking to a site, such as YouTube™, that specializes in presenting video data.

In one embodiment, the social network 1600 can include a membership management module 1640 to in the social network. In one embodiment, the membership management module 1640 can seek new members through advertising on other social networks or on through media outlets and websites. In one embodiment, the module can enable new members to register under the social network 1600 with user names and passwords. For example, the social network 1600 can host a website that allows new members to join by entering information into a new member registration window. In one embodiment, the module can store membership information for access by the social network for enhancing the member's experience. For example, the membership management module 1640 can store information on the member's favorite video games or professional players or publishers. Other modules, such as a marketing module 1662, can use this information to target marketing to the member for special content, offers, or experiences. In one embodiment, the membership management module 1640 can remove members from the social network for violations of member rules.

In one embodiment, the social network 1600 can include an incentivizing module 1654 which can offer various incentives for new members to join the social network or for existing members to be retained. In one embodiment, the incentivizing module 1654 can offer credits to members of the social network for participating in various aspects of the network. For example, the incentivizing module 1654 can offer credits for comments entered on topics of video games, gamers, hardware, and other content. In another example, credits can be earned for members who allow their hardware data and/or graphical video to be collected and shared at the social network 1600. For example, credits can be earned for providing additional content in blogs or for participating in comment moderation actions. For example, a member can earn credits for censoring content due to profanity or other reasons.

In one embodiment, the social network 1600 can include an accounting module 1658 for tracking member credits. In one embodiment, members can be awarded credits for various favored activities, including logging into the social network site, entering comments and ratings, participating in activities, and sharing data. In one embodiment, credits can be subtracted from members for various disfavored behaviors. For example, credits can be subtracted crude or offensive or profane comments. In another example, credits can degrade over time if a member fails to log in. In one embodiment, the social network can award differing levels of status to members based on credits. For example, a member can be awarded a leadership status based on achieving a level of comments and/or longevity in the social network. In one embodiment, the accounting module 1658 can deduct credits whenever a member exchanges credits for a reward through a rewarding module 1666.

In one embodiment, the social network 1600 can include a marketing module 1662 for targeting various marketing to the social network as a whole and to individual members. In one embodiment, the social network 1600 can be sponsored by a specific company, such as by a seller of gaming-related products, or by multiple vendors. In one embodiment, vendors can purchase advertising space on the social network site, either directly or through a third-party web advertising firm. In one embodiment, the marketing module 1662 uses information from individual members to target specific content to these members. For example, the marketing module 1662 can access membership registration data and use profiling data to target advertisements or offers for content to members based on demographics, stated likes or dislikes, game-playing habits, and/or favorites. In one embodiment, the marketing module 1662 can link interested third parties to special events hosted on the social network site, such as gaming tournaments, fantasy leagues based on gamer statistics, and content premiers.

In one embodiment, the social network 1600 can include a rewarding module 1666 for advertising and presenting awards to members of the social network based on credits or other member actions. In one embodiment, the rewarding module 1666 can award members access to special content, such as free or discounted hardware accessories, gaming-related products, and/or video games. In one embodiment, the rewarding module 1666 can award members access to professional gamer hardware profiles and/or graphical video of game play. In one embodiment, addition al features in the social network site are unlocked as reward. For example, a member can gain access to additional content from publishers and business partners associated with the site.

In one embodiment, the social network 1600 can include a comment management module 1670 for acquiring, compiling, presenting, and censoring member comments. For example, the comment management module 1670 can oversee opening and closing of comments, censoring of offensive or illegal comments, and grading comments for the earning credits. In one embodiment, Comments can be presented with other site content and/or links to related content. The comment management module 1670 can allow member comment on particular gamers, such as professional gamers, and on hardware and software. Comments can be captured and displayed in association with gaming tournaments, fantasy leagues, and other special activities on the site. In one embodiment, members can add content to the site contingent upon a democratic vote of other members.

In one embodiment, the social network 1600 can include a rating module 1674 for capturing and compiling member ratings of games, game hardware, gamers, and other game-related content. For example, the rating module 1674 can request member ratings of gamers, such as professional gamers, whose hardware profiles are presented at the site. In one embodiment, member ratings of hardware and games and related content are collected. In one embodiment, member ratings are used by a valuation module 1678 to provide member valuations for content at the site. In one embodiment, members input can provide values for gamer statistics, performance factors, and/or skill profiles. For example, members can vote to decide a relative value for each gamer's profile or to establish a standard value for different profile levels. In one embodiment, member-derived valuations of gamer profiles can be used for a "belt" system similar to the colored belt system that governs martial arts training.

In one embodiment, the social network 1600 can compare hardware profiles of two or more gamers and present the results to the members of the social network. For example, the social network can compare a profile of a professional gamer with that of a member who has allowed the network to collect his or her hardware statistics.

In one embodiment, the social network 1600 can compare hardware profiles of two or more gamers and attempt to match gamers in prospective video game play opportunities. For example, the social network 1600 can allow members to post prospective gaming opportunities on the network site and solicit other members to join in on game play either as teammates or as opponents. In one embodiment, the members can request gamers of certain hardware profiles and/or skill profiles and allow the social network to suggest other members whose profiles are stored in the network. In one embodiment, members can allow the social network to review their own hardware and/or skill profiles, as compiled by their submitted data, and to attempt to find other members with similar profiles as opponents of teammates. In one embodiment, the social network can attempt to match members with complimentary skill profiles for team opportunities. For example, the social network can attempt to compile a team of players with complimentary skill set, such as matching good defenders with good attackers, snipers with close combat experts, and leaders with followers. In one embodiment, the social network 1600 can host a competition based on opponents and/or teams that have been suggested and/or compiled by the social network.

In one embodiment, the social network 1600 can construct a hardware profile for a computer-controlled player associated with a video game. In one embodiment, the social network can statistically analyze hardware stimulation data from a database of many gamers who have allowed their data to be captured by the network. The social network can create a prospective computer-controlled player with average, below average, or above average abilities to provide varied competition for players of the video game in computer-player mode. The social network can create a professional player model of the computer-generated player by accessing data from professional players.

Figure 19:
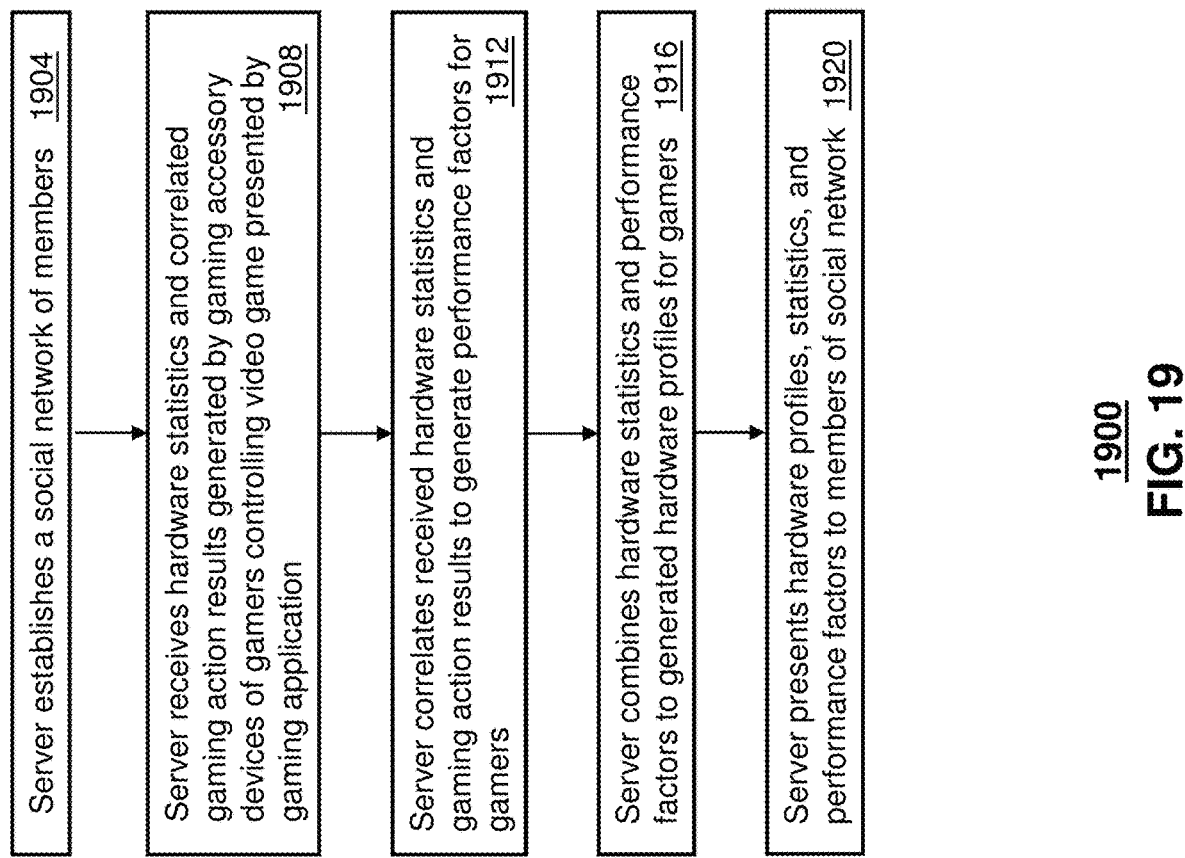
FIG. 19 depicts illustrative embodiments of a method operating in portions of the systems described in FIGS. 1-17.

FIG. 19 depicts illustrative embodiments of a method 1900 operating in portions of the systems described in FIGS. 1-17. Method 1900 can begin with step 1904 in which a server can establish a social network of members. In one embodiment, the social network can be based on an internet website. In one embodiment, the social network can be a page or other entity of a general-purpose social media site. In one embodiment, the social network can register a set of members and manage access to content of the social network through member logins.

In step 1908, the server can receive hardware statistics and correlated gaming action results generated by gaming accessory devices of gamers controlling video game presented by gaming application. In one embodiment, the server can receive the hardware statistics and gaming action results from devices over a network connection, such as an Internet protocol connection. In one embodiment, the gaming accessory devices can be monitored and processed at the computer devices by AMS software that converts user inputs into game stimulations that, in turn, can generate gaming action results as the gaming application is executed. In one embodiment, the server can receive hardware statistics and gaming action results from many gamer devices to thereby create a large database of gamer and hardware performance that can be analyzed and shared with members of the social network.

In step 1912, the server can correlate received hardware statistics and gaming action results to generate performance factors for gamers. In one embodiment, the server can receive raw gaming simulations, macro-substituted stimulations, and gaming action results for each gamer participating in play of a video game. In one embodiment, the server can correlate the received raw gaming simulations, macro-substituted stimulations, and gaming action results to calculate performance factors for this gamer.

In step 1916, the server can combine hardware statistics and performance factors to generated hardware profiles for gamers. In one embodiment, the gamer hardware profile can include a combination of hardware statistics associated with the gamer and performance factors correlated for the gamer. In one embodiment, the gamer hardware profile can include averages of values acquired by the social network for various time periods, including, for example, single game plays, tournament averages, league averages, and lifetime averages. In one embodiment, the gamer hardware profile can include comparative ratings against other gamers.

In step 1920, the server presents hardware profiles, statistics, and performance factors to members of social network. In one embodiment, the server can present hardware statistics, performance factors, and hardware profiles to members. In one embodiment, the server can present graphical representations of game play to members of the social network.

From the foregoing descriptions, it would be evident to an artisan with ordinary skill in the art that the aforementioned embodiments can be modified, reduced, or enhanced without departing from the scope and spirit of the claims described below.

In one embodiment, the social network can store multiple recorded game sessions for each gamer that has agreed to share data with the network. The stored session can be adapted to compare a history of game sessions to assess how each gamer's performance has evolved. Each gamer's improvement or degradation detected by the social network over a number of gaming sessions can be reported to the gamer and/or other gamers as progression line charts, histograms, pie charts or other suitable presentation methods. The results can also be reported in a gaming tournament, on-line games, or other suitable setting in a manner similar to the illustrations of FIGS. 11-14. In one embodiment, the social network can detect improvements or degradations in performance between a present tournament game and the previously recorded tournament game and report the results to members of the network.

In yet another embodiment, the social network can compare a gamer's performance to another gamer's recorded performance. The garners' performance can be compared to each other based on a present gaming session or on prior recorded sessions. In one embodiment, the social network can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

In yet another embodiment, the social network can be adapted to alert members when a particular gamer has achieved certain performance criteria. For instance, the social network can present a GUI to identify performance criteria of interest (e.g., number of kill hits, average hit rate for a particular weapon, a particular ranking of a gamer for a particular gaming application, etc.). The identified performance criteria can be monitored by the social network for the selected gamer and when one or more criteria have been achieved by the monitored gamer, the server can alert the interested members by suitable communication means such as email, short messaging system (SMS) text message, or a GUI of a website or other entity directed by the social network.

In another embodiment, the social network can compare the performance of the gamers to other users of a particular gaming console or hardware accessory. For example, the social network can compare all gamers using a certain brand of mouse or keyboard. In one embodiment, the social network can compare an aggregated performance value for all users of one brand versus all users of another brand.

The foregoing embodiments are a subset of possible embodiments contemplated by the present disclosure. Other suitable modifications can be applied to the present disclosure.

FIG. 20 depicts an exemplary diagrammatic representation of a machine in the form of a computer system 2000 within which a set of instructions, when executed, may cause the machine to perform any one or more of the methods discussed above. One or more instances of the machine can operate as any of devices depicted in FIGS. 1-3, and FIG. 15. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2000 may include a processor 2002 (e.g., a central processing unit (CPU), a graphics processing unit (GPU, or both), a main memory 2004 and a static memory 2006, which communicate with each other via a bus 2008. The computer system 2000 may further include a video display unit 2010 (e.g., a liquid crystal display (LCD), a flat panel, or a solid-state display. The computer system 2000 may include an input device 2012 (e.g., a keyboard), a cursor control device 2014 (e.g., a mouse), a disk drive unit 2016, a signal generation device 2018 (e.g., a speaker or remote control) and a network interface device 2020.

The disk drive unit 2016 may include a tangible computer-readable storage medium 2022 on which is stored one or more sets of instructions (e.g., software 2024) embodying any one or more of the methods or functions described herein, including those methods illustrated above. The instructions 2024 may also reside, completely or at least partially, within the main memory 2004, the static memory 2006, and/or within the processor 2002 during execution thereof by the computer system 2000. The main memory 2004 and the processor 2002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 2000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a processing system including a processor; and
    a memory that stores executable instructions that, when executed by the processing system, facilitate performance of operations, the operations comprising:
    initiating a social network including a plurality of members of the social network and a plurality of computer devices for operating gaming programs;
    receiving, from the plurality of computer devices, hardware statistics associated with a plurality of gamers that play the gaming programs and performance factors;
    receiving stimulus signals generated by one or more gaming accessory devices associated with gamers of the plurality of gamers;
    generating substituted stimulations based on the stimulus signals, including substituting a stimulation for a received standard stimulus signal to personalize operation of the one or more gaming accessory devices;
    combining the hardware statistics and the performance factors that are received to generate a plurality of hardware profiles, each respective hardware profile of the plurality of hardware profiles being associated with a respective gamer of the plurality of gamers;
    presenting a hardware profile that is associated with a gamer of the plurality of gamers to a portion of the plurality of members of the social network;
    presenting an interface to a member of the social network, the interface configured to identify performance criteria for selected gamers of the plurality of gamers; and
    alerting the member of the social network if the gamer of the plurality of gamers achieves the performance criteria of interest for the selected gamers.

2. The device of claim 1, wherein the alerting the member of the social network comprises:
    transmitting a communication to one or more gamers of the plurality of gamers.

3. The device of claim 2, wherein the transmitting a communication to one or more gamers comprises:
    transmitting a short messaging system (SMS) text message.

4. The device of claim 2, wherein the transmitting a communication to one or more gamers comprises:
    transmitting an email message.

5. The device of claim 1, wherein the receiving hardware statistics associated with a plurality of gamers comprises:
    receiving a set of gaming stimulations, a set of substituted stimulations, and a set of gaming results that have been collected by respective computer devices of the plurality of gamers.

6. The device of claim 5, wherein the receiving hardware statistics comprises:
    receiving the hardware statistics for which the respective computer devices correlate the set of gaming stimulations and the set of substituted stimulations to a set of gaming results and for which the respective computer devices of the plurality of computer devices further correlate the set of gaming stimulations, the set of substituted stimulations, and the set of gaming results to generate a set of performance factors.

7. The device of claim 1, wherein the operations further comprise:
    synthesizing at least one skill profile of one gamer of the plurality of gamers by detecting correlations between portions of the hardware statistics or portions of the performance factors or combinations thereof; and
    presenting information about the at least one skill profile to at least some members of the plurality of members of the social network.

8. The device of claim 1, wherein the operations further comprise:
    comparing two or more hardware profiles of the plurality of hardware profiles corresponding to two or more gamers of the plurality of gamers; and
    presenting the two or more hardware profiles that are compared to a portion of the plurality of members of the social network.

9. The device of claim 1, wherein the operations further comprise:
    capturing a plurality of comments from the plurality of members of the social network; and
    presenting the plurality of comments at a website for access by at least a portion of the plurality of members of the social network.

10. The device of claim 9, wherein the capturing the plurality of comments comprises:
    capturing comments associated with a hardware profile or with a graphical representation associated with a portion of the hardware statistics.

11. A non-transitory machine-readable medium, comprising executable instructions that, when executed by a processing system including a processor, facilitate performance of operations, the operations comprising:
    initiating a social network including a plurality of members and a plurality of computer devices for operating gaming programs;
    receiving stimulus signals generated by one or more computer devices associated with gamers of a plurality of gamers;
    generating substituted stimulations based on the stimulus signals, including substituting a stimulation for a received standard stimulus signal to personalize operation of the one or more computer devices of the plurality of computer devices;
    receiving, from the plurality of computer devices, a plurality of hardware statistics associated with a plurality of gamers using the gaming programs, including receiving a plurality of gaming results and a plurality of performance factors;

combining the plurality of hardware statistics and the plurality of performance factors to generate a plurality of hardware profiles that are associated with the plurality of gamers, a respective hardware profile of the plurality of hardware profiles associated with a respective gamer of the plurality of gamers;

presenting an interface to a member of the social network, wherein the interface is configured to identify performance criteria for selected members of the plurality of gamers; and presenting information about the hardware statistics to the members of the plurality of members of the social network, wherein the presenting information comprises presenting an alert to the member of the plurality of members of the social network when a gamer of the plurality of gamers achieves one or more specified performance criteria of interest to the member.

12. The non-transitory machine-readable medium of claim 11, wherein the receiving the plurality of hardware statistics comprises:

receiving hardware statistics wherein, for each computer device of the plurality of computer devices, the computer device has collected a set of gaming stimulations initiated by a gamer associated with the each computer device, a set of substituted stimulations corresponding to the gaming stimulations, and a set of gaming results, wherein the computer device has correlated the set of gaming stimulations and the set of substituted stimulations to a set of gaming results, and the computer device has further correlated the set of gaming stimulations, the set of substituted stimulations, and the set of gaming results to generate a set of performance factors.

13. The non-transitory machine-readable medium of claim 11, wherein the operations further comprise:

comparing two or more hardware profiles of the plurality of hardware profiles;

detecting patterns based on the comparing; and associating two or more gamers of the plurality of gamers according to the patterns, wherein the associating is according to criteria applied to the patterns.

14. The non-transitory machine-readable medium of claim 13, wherein the operations further comprise:

matching the two or more gamers for participation in a session of a gaming application.

15. The non-transitory machine-readable medium of claim 14, wherein the operations further comprise:

hosting a game play of the gaming application comprising the two or more gamers that are matched; and presenting information about the game play of the gaming application to a portion of the plurality of members of the social network.

16. The non-transitory machine-readable medium of claim 13, wherein the operations further comprise:

notifying the two or more gamers that the two or more gamers are compatible for social networking.

17. A method, comprising:

receiving, by a processing system including a processor, stimulus signals generated by one or more gaming accessory devices of a gamer controlling a gaming application;

generating, by the processing system, gaming stimulations based on the stimulus signals, including substituting a stimulation for a received standard stimulus signal to personalize operation of the one or more gaming accessory devices, forming substituted stimulations;

generating, by the processing system, gaming action results from the gaming application responsive to the gaming stimulations, wherein the generating the gaming action results comprises correlating, by the processing system, the gaming stimulations and the substituted stimulations;

correlating, by the processing system, the gaming stimulations, the substituted stimulations, and the gaming results to generate a set of performance factors;

generating, by the processing system, hardware statistics associated with the gamer, wherein the hardware statistics comprise information about the gaming action results and the gaming stimulations, wherein the hardware statistics include the set of performance factors;

presenting an interface to a member of a social network including the gamer, the interface configured to identify performance criteria for the gamer; and communicating, by the processing system, the hardware statistics associated with the gamer to a social network for presentation to one or more members of the social network, including communicating an alert to the member of the social network if the gamer achieves one or more performance criteria of interest to the member.

18. The method of claim 17, comprising:

receiving, by the processing system, stimulus signals generated by a gaming accessory device; and receiving, by the processing system, substituted stimulations comprising signals that are substituted for a portion of the stimulus signals based on a pre-arranged substitution strategy of the gaming accessory device.

19. The method of claim 18, comprising:

generating, by the processing system, a gamer hardware profile of the gamer, wherein the gamer hardware profile comprises hardware statistics for the gamer and performance factors for the gamer, and including comparative ratings for the gamer against other games.

20. The method of claim 19, comprising:

combining, by the processing system, the set of performance factors and the hardware statistics to form the hardware profile of the gamer; and communicating, by the processing system, the hardware profile of the gamer to the social network.

* * * * *

UNITED STATES PATENT AND TRADEMARK OFFICE
CERTIFICATE OF CORRECTION

PATENT NO. : 12,233,334 B2
APPLICATION NO. : 18/316295
DATED : February 25, 2025
INVENTOR(S) : Kim Rom et al.

Page 1 of 1

It is certified that error appears in the above-identified patent and that said Letters Patent is hereby corrected as shown below:

In the Specification

In the Detailed Description:

Column 2, Line 49, delete "garners" and replace with "gamers".

Column 2, Line 51, delete "garners" and replace with "gamers".

Column 2, Line 61, delete "garners" and replace with "gamers".

Column 2, Line 64, delete "garners" and replace with "gamers".

Column 3, Line 6, delete "garner" and replace with "gamer".

Column 3, Line 13, delete "garner" and replace with "gamer".

Column 3, Line 14, delete "garner" and replace with "gamer".

Signed and Sealed this
Twenty-second Day of April, 2025

Coke Morgan Stewart
*Acting Director of the United States Patent and Trademark Office*